Dec. 31, 1935.  A. E. RICE ET AL  2,026,141
MULTIPLE SPEED GEAR DRIVEN DRAW WORKS
Filed Aug. 4, 1931  6 Sheets-Sheet 1

Fig. 1.

Inventors
Allen Erwin Rice
John Shelby Morgan Jr.
By Lyon & Lyon
Attorneys

Dec. 31, 1935.  A. E. RICE ET AL  2,026,141
MULTIPLE SPEED GEAR DRIVEN DRAW WORKS
Filed Aug. 4, 1931  6 Sheets-Sheet 5

Inventors
Allen Erwin Rice
John Shelby Morgan Jr.
By Lyon & Lyon
Attorneys

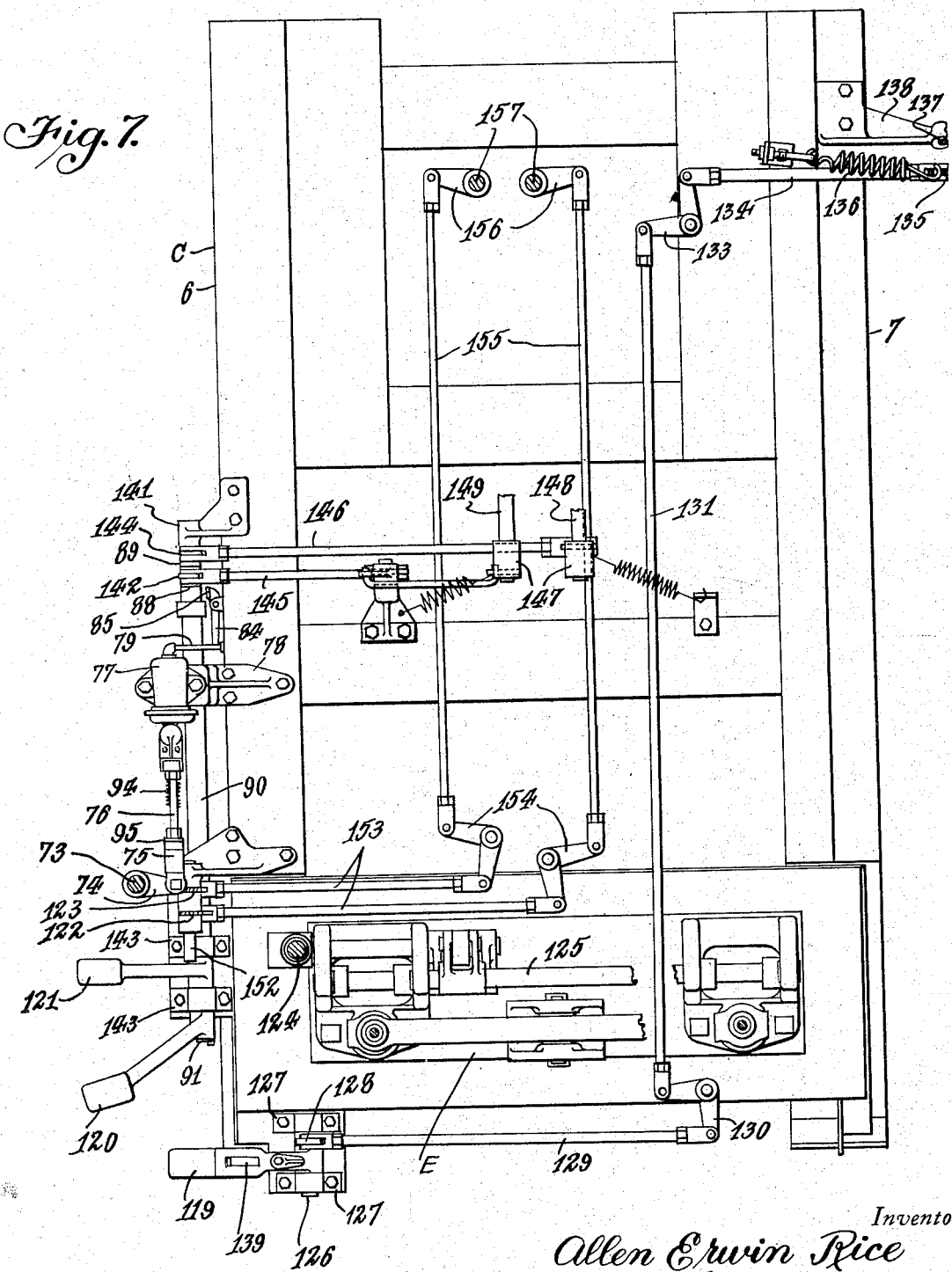

Patented Dec. 31, 1935

2,026,141

UNITED STATES PATENT OFFICE 2,026,141

MULTIPLE SPEED GEAR DRIVEN DRAW WORKS

Allen Erwin Rice, Palos Verdes, and John Shelby Morgan, Jr., Inglewood, Calif., assignors to The National Supply Company, Toledo, Ohio, a corporation of Ohio Application August 4, 1931, Serial No. 554,982

68 Claims. (Cl. 255—19)

This invention relates to drawworks as utilized in the rotary process of drilling wells, and more particularly to a multiple speed gear driven drawworks wherein a gear transmission is provided for driving the drumshaft of the drawworks at a multiple of speeds and for driving the rotary machine drive sprocket at more than one speed, and which is so constructed as to make available at all times during the drilling operation the direct or high speed drive for the drum shaft.

In the present constructions of drawworks, when running in the hole is such that when the weight of the pipe in the hole requires a low speed connection to the drum shaft in order to lift the pipe when the slips supporting the pipe are removed, the driller does not attempt to shift back to high speed when taking the elevator by which the pipe is supported up in the derrick as to make such a shift in driving connection requires the shifting of a multiplicity of clutches resulting in a greater loss in time in running in the hole than to merely continue the operation of the drawworks at the low speed.

In wells as now being drilled for the recovery of oil, gas and the like, where the wells are drilled to relatively great depths of in excess of 7,500 feet, considerable time is lost in the drilling operation due to the small drum sizes in the rotary drawworks and slow speeds of operation, as well as due to the difficulty encountered in the shifting of the driving connections of the drawworks from the low or intermediate speeds to the high or direct speed drive.

As wells increase in depth, greater flexibility of operation of the rotary drawworks is essential in order to speed up the drilling operation, particularly in the running in or out the drill pipe for the purpose of changing bits, drills or other tools.

In order to overcome these difficulties, it is essential that larger hoisting drums be utilized, as well as a greater flexibility of change speed mechanism being provided. As the size of the drums are increased, different means must be provided for driving the drumshaft as the drum itself occupies the available space in the derrick heretofore occupied by the change speed mechanisms employed in the rotary drawworks.

As the hoisting lines or cables are subjected to greater weights, the drum also must be increased in diameter so that a lesser strain is imparted to the supporting cables as the lines are reeled to greater diameters and are not subjected to the great strains while coiled to the small diameters of the hoisting drums heretofore utilized in rotary drawworks.

It is therefore an object of this invention to provide an improved form of rotary drawworks wherein a change speed transmission mechanism is provided for driving the drum shaft of the rotary drawworks at a multiple of speeds which is so constructed and arranged as to make available at all times the direct or high speed drive connection from the prime mover to the drumshaft, and which is also so constructed as to provide a multiple speed drive for operating the rotary machine drive sprocket of the rotary drawworks.

Other objects and advantages of this invention it is believed will be apparent from the following detailed description of a preferred embodiment thereof as illustrated in the accompanying drawings.

In the drawings:

Figure 1 is a plan view partly in section of a rotary drawworks embodying our invention.

Figure 7 is a plan view of the drawworks frame and control assemblies embodied in our invention.

Figure 2:
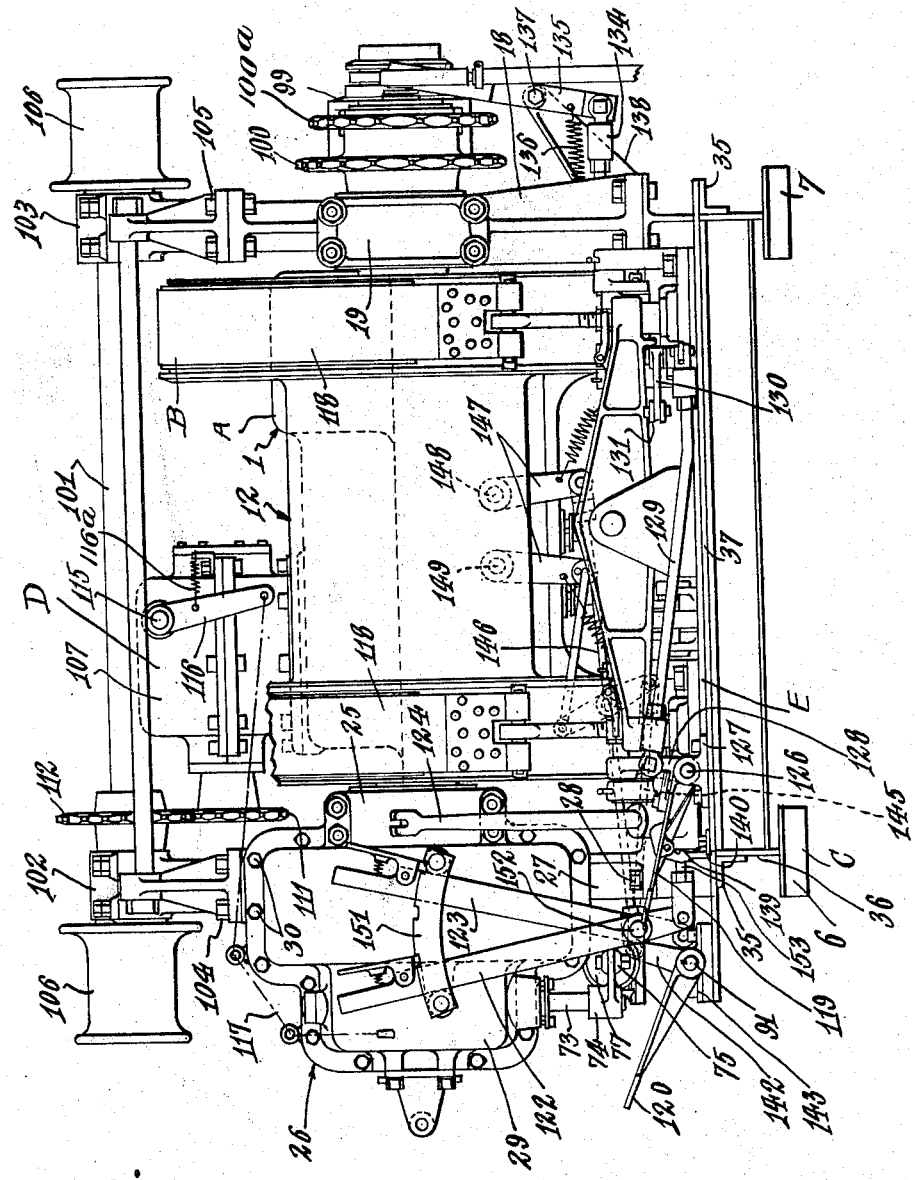
Figure 2 is a front elevation thereof.
Figure 3:
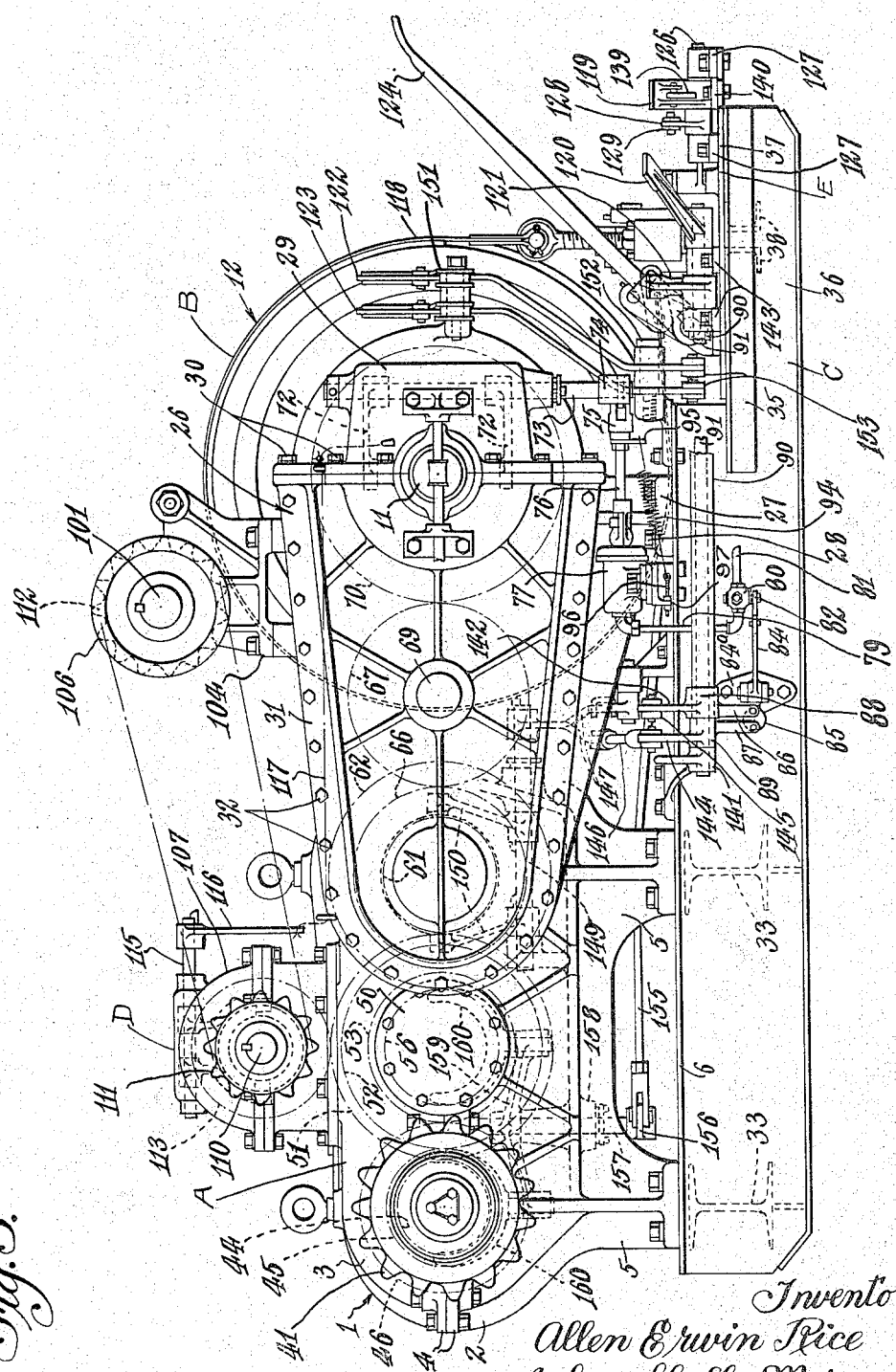
Figure 3 is a left-hand side elevation thereof.

In the preferred embodiment of our invention illustrated in the accompanying drawings, there is indicated a drawworks embodying our invention including a multiple speed transmission assembly A, operatively connected with a drumshaft assembly B. The multiple speed transmission assembly A and the drumshaft assembly B are supported upon a frame assembly C upon which frame assembly C control unit assembly E is mounted. Supported by the multiple speed transmission assembly A and the drumshaft assembly B is a catshaft drive assembly D. The unitary structure thus provided of the assembly units supported upon the frame assembly may be set up in the derrick with a minimum of rigging up, and may also be transported as a unit from derrick to derrick as desired or required.

The transmission assembly is provided with a case I which is formed in two sections, a lower section 2 and an upper or cover section 3, the two sections being bolted together at their connecting flanges 4. The lower section 2 is formed to provide spaced supporting legs 5 which are bolted to the right and left-hand skids 6 and 7 of the frame assembly C. The case 1 is split to form the two sections 2 and 3 on the centers of the shafts mounted within the case 1, including the pinion shaft 8, the intermediate shaft 9, and the power take-off shaft 10. In a rotary drawworks construction it is common to refer to the shafts of the drawworks as the "jack shaft, line shaft, drum shaft" in a three-shaft construction, and where the drawworks includes a fourth shaft, to refer to such shaft as a "countershaft". Because of the variations of drive permissible when utilizing the drawworks embodying our invention, we believe that these terms are inapplicable to designate the drawworks shafts, as under some conditions the pinion shaft 8 might be referred to as the countershaft, the intermediate shaft might be referred to as the jack shaft, and the power take-off shaft might be referred to as the line shaft. Under other conditions of drive, however, this designation would not be strictly applicable particularly under such instances as when the drive is taken from the quill shaft 39, and the pinion shaft 8 remains idle.

The drumshaft assembly B includes a drumshaft 11 upon which a hoisting drum 12 is mounted. The hoisting drum 12 may be of any suitable or desirable construction well understood in the art, and includes brake rims 13 secured to end flanges 14 of the spooling section 15. The drum 12 is secured to the shaft 11. The shaft 11 is journaled in roller bearings 16 and 17. The bearing 16 is mounted in a pedestal 18 which is formed to provide a bearing box split in a vertical plane providing a removable bearing box cover 19. Formed integral with the pedestal 18 is a radius arm 20 which extends rearwardly from the shaft 11 and is provided with a hub 21 adapted to fit over the cylindrical sleeve 22 of a bearing retainer 23 supporting roller bearing 24 for one end of the power take-off shaft 10. The bearing 17 is mounted in a bearing sleeve 25 provided by gear case 26. The gear case 26 is formed integral with the supporting foot 27 which is supported upon and secured to the skids 6 by means of bolts 28. The gear case 26 is formed to provide a split bearing sleeve 25 for the bearing 17 in a vertical plane passing through the center of the shaft 11, and to form a cap 29 which is bolted by bolts 30 to the case 26.

In order to permit access to the gears mounted within the gear case 26, the gear case 26 is formed with a removable gear case cover 31 bolted to gear case 26 by means of bolts 32.

The frame assembly C includes the spaced skids 6 and 7 which are formed in the preferred embodiment of our invention of I beams coupled together by transverse I beams 33 secured to the skids 6 and 7 by any suitable or desirable means immediately below the supporting legs 5 of the transmission case 1. The skids 6 and 7 in advance of the shaft 11 are cut down, and angle irons 35 are secured to the vertical webs 36 of the skids 6 and 7 to receive the base plate 37 of the control unit assembly E. The plate 37 is supported by means of transverse channel irons 38 connected between skids 6 and 7.

The drumshaft assembly B is driven from the transmission assembly A preferably in the following manner:

The pinion shaft 8 is supported in the transmission case 1 in roller bearing 40 and a quill shaft 39 is mounted on the pinion shaft 8 within the bearing 40a. Secured to the quill shaft 39 is the drive sprocket 41 which may be driven from any suitable or desirable source not shown. The quill shaft 39 is supported on the pinion shaft 8 upon roller bearings 42 and 43. Journaled on the pinion shaft are drive pinions 44 and 45 and keyed to the pinion shaft 8 is a drive pinion 46. The pinion 44 is formed on the end of the quill shaft 39.

Splined in the pinion shaft 8 is a quill shaft clutch 47 and a pinion shaft clutch 48. The intermediate shaft 9 is journaled in roller bearings 49 supported in a transmission housing 1 in bearing retainers 50 which are removably bolted to the transmission case 1. Journaled on the intermediate shaft 9 are pinions 51 and 52. Secured to the intermediate shaft 9 is a pinion 53. The pinion 51 meshes with the drive pinion 44 formed at the inner end of the quill shaft 39. The pinion 52 meshes with the pinion 45 journaled on the pinion shaft 8 while the pinions 46 and 53 are in mesh.

Splined on the intermediate shaft 9 are clutches 54 and 55 for releasably clutching pinions 51 and 52 to the intermediate shaft 9. The pinion 52 is nonrotatably secured to the hub extension of a pinion 56 by means of a key, and the two pinions 52 and 56 are supported on the intermediate shaft by roller bearings 57, and the pinion 51 is likewise journaled on the intermediate shaft 9 on roller bearings 58.

The power take-off shaft 10 is journaled in roller bearings 24 and 59 within the transmission case 1. The roller bearings 59 are supported in a bearing retaining sleeve 60 releasably bolted as indicated at 60a to the transmission case 1.

Journaled on power take-off shaft 10 is a high speed pinion 61 and a low speed pinion 62. The pinions 61 and 62 are journaled on the shaft 10 on roller bearings 63. Splined on the power take-off shaft 10 between high and low speed pinions 61 and 62 are low and high speed clutches 65 and 64 respectively. The low and high speed clutches 65 and 64 provide means for releasably clutching the low and high speed pinions 62 and 61 to power take-off shaft 10. The high speed pinion 61 is mounted on the power take-off shaft 10 to mesh with the pinion 51 of the intermediate shaft 9 and the low speed pinion 62 is mounted on the power take-off shaft 10 to mesh with the pinion 56 which is journaled on the intermediate shaft 9.

The power take-off shaft 10 overhangs the transmission case 1 and at its outer end is keyed to driving gear 66 mounted within the gear case 26. The drive gear 66 meshes with idler gear 67 journaled on roller bearings 68 on a shaft 69 supported by the gear case 26 and cover 31. The idler gear 67 meshes with a driven gear 70 journaled on the drumshaft 11 within the gase case 26. A clutch 71 is splined on the shaft 11 for releasably clutching the gear 70 to the drumshaft 11.

Means are provided for actuating the clutch 71 so that the clutch 71 is normally held out of engagement and is urged into engagement only after the high or low speed clutches 64 and 65 have been engaged. This means preferably includes a clutch shifter arm 72 which is secured to a vertically extending clutch shifter shaft 73 which extends from the cover 29 of the gear case 26.

Secured to the lower end of the shifter shaft 73 is a crank 74 which is connected by means of a clevis 75 with a rod 76. The rod 76 is secured to a piston mounted in a cylinder 77 secured by means of a bracket 78 to the skids 6. The cylinder 77 is connected by means of a conduit 79 with a three-way valve 80 which in turn is connected by means of a conduit 81 with a source of fluid under pressure. The three-way valve 80 is of the type that is normally and yieldably urged to a position in which the cylinder 77 is normally exhausted to the atmosphere. The actuating arm 82 of the valve 80 is connected by means of a link 83 to a rocker 84 fulcrumed on a pin of a bracket 84a. The rocker 84 is provided with an engaging arm 85 which is adapted to be engaged by actuating arms 86 and 87 formed integral with collars 88 and 89 secured to the actuating shafts 90 and 91 for the high and low speed clutches 64 and 65 respectively.

In order to provide for the proper actuation of the three-way valve 80, adjustable contacting screws 92 are carried by the ends of the arms 86 and 87. Contacting screws are adjusted in position by threading the same through the ends of the arms 86 and 87 respectively and are locked in adjusted position by means of lock nuts 93. The opening of the three-way valve 80 to admit fluid under pressure into the cylinder 77 acts to rotate the shifter shaft 73 in a clockwise direction to cause the clutch 71 to move along the shaft 11 into engaging position so that the shaft 11 is driven by the driven gear 70. The clutch 71 is yieldably urged out of engaging position by means of a spring 94 which is connected to a spring plate 95 secured to the rod 76 at one end and to a hook bolt 96 adjustably secured to a bracket 97 at its opposite end. The spring 94 acts to rotate the shifter shaft 73 in a counter-clockwise direction to thereby yieldably urge the clutch 71 out of clutching position.

Means are provided for driving a rotary machine from the multiple gear driven drawworks which provide means for driving the rotary machine at two speeds. This means preferably includes a rotary machine drive sprocket 98 which is journaled upon the pinion shaft 8 at the right hand side of the rotary drawworks on the outside of the transmission housing 1.

Splined on the pinion shaft 8 is a clutch 99 for releasably clutching the rotary machine drive sprocket 98 to the pinion shaft 8. Mounted on the drawworks shaft 11 is a double idler sprocket 100 which is driven from the rotary machine drive sprocket 98 and which likewise provides means in the form of a driven sprocket 100a for connecting the drive to the rotary machine.

In order to drive the rotary machine drive sprocket 98 at two speeds, the following operation through the transmission 1 is performed. When the clutch 47 on the pinion shaft 8 is engaged with the splined portion 44c on the quill shaft 39, the pinion shaft 8 is driven direct from the drive sprocket 41 so that with the clutch 99 engaged a direct drive from the prime mover or engine to the rotary drive sprocket 98 is had. With the clutch 47 released and the clutch 54 engaged, the drive to the rotary machine drive sprocket 98 is from the pinion 44 to the gear 51, the intermediate shaft 9 through the gear 53 driven by the shaft 9 to the gear 46 secured to the pinion shaft 8 so that with the clutch 99 engaged, rotary machine drive sprocket 98 is driven at a reduced speed.

While the sprocket 98 is herein referred to as the sprocket for driving a rotary machine, it is obvious that the sprocket 98 might be utilized equally well for driving other mechanism in a rig and it is not intended to limit the use of this sprocket for the purpose of driving a rotary table. The sprocket 98 is referred to as a rotary drive sprocket herein for the purpose of convenience of designation.

The catshaft unit D preferably comprises a catshaft 101 which is journaled in bearings mounted in standards 102 and 103 respectively. The standard 102 is secured to the gear case 25 as indicated at 104 and the standard 103 is secured to the pedestal 18 as indicated at 105.

A cathead pulley 106 is secured to each projecting end of the catshaft 101. The catshaft 101 is driven from the transmission unit A, preferably in the following manner:

Secured over an opening in the cover 3 of the transmission housing 1 is a catshaft drive housing 107 which is split in two halves to provide supports for roller bearings 108 and 109 upon which a catshaft drive shaft 110 is journaled. The catshaft drive shaft projects from the end of the housing 107 and its overhanging end is provided with a sprocket 111. The sprocket 111 is in line with a sprocket 112 mounted on the catshaft 101 and a chain, not shown, connects sprockets 111 and 112. Journaled on the catshaft drive shaft 110 within the housing 107 is a drive shaft gear 113 which meshes with the gear 51 within the transmission housing 1. Splined on the shaft 110 is a clutch 114 for releasably clutching gear 113 to the shaft 110. The shifter fork for the clutch 114 is secured to a shaft 115 which projects from the housing 107 and is secured to an operating lever 116. A cable 117 is connected with the lever 116 and extends forwardly to a point of access by the driller operating the rotary drawworks. The clutch 114 is normally urged out of driving engagement with the gear 113 by means of a spring 116a, so that the drive to the cat shaft 101 is automatically interrupted upon the driller releasing the pull on the cable 117. The control unit E includes operating levers for operating brake bands 118 mounted on the brake rims 13 of the drawworks drum 12, a control pedal 119 for the rotary machine drive sprocket clutch 99, a control pedal 120 for the low speed clutch 65, a control pedal 121 for the high speed clutch 64, and control levers 122 and 123 for actuating the 50 clutches 54 and 47, 55 and 48 mounted on the intermediate shaft 9 and the pinion shaft 8, respectively.

The controls above set forth are assembled as a unit upon the frame unit C at the left-hand side of the drawworks drum 12 upon the control unit plate 37 so that the drawworks of our invention may be positioned within a drilling rig and will require a minimum of rigging up in order to place the same in operative relation between the prime mover and the rotary machine of such a drilling rig.

A brake lever 124 is provided for actuating the brake rocker shaft 125 for tightening or loosening the brake bands 118 on the brake rims 13. The specific construction of the brake actuating mechanism will not herein be set forth as this construction is the subject of the copending application of Forrest Joseph Young and Spencer William Long, for Brakes with equalizer. Serial No. 519,508, filed March 2, 1931, now Letters Patent No. 1,956,433, issued April 24, 1934.

The rotary machine actuating pedal 119 is journalled on a shaft 126 supported in bearings 127 secured to the control plate 37. A crank arm 128 is formed integral with the hub of the pedal 119 and is connected with a rod 129 which is connected to the crank arm 130 of a connecting rod 131 which extends under the drum 12 and below the transmission case 1 where it is connected to a bell crank 133 which is pivotally secured to a plate secured to the right-hand skid 7 at the rear of the frame unit C. The opposite lever of the bell crank 133 is connected to the clutch yoke rod 134 which extends transversely of the frame unit C and is connected to the clutch yoke 135 for shifting the rotary machine drive sprocket clutch 99.

A spring 136 is connected between the clutch yoke 135 and the frame unit C for normally urging the rotary machine drive sprocket clutch 99 out of engaged position. The clutch yoke 135 is pivotally supported as indicated at 137 to a bracket 138 secured to the right-hand skid 7. A latch dog 139 adapted to engage the bracket 140 is provided for latching the pedal 119 down to hold the clutch 99 engaged.

The low and high speed clutch pedals 120 and 121 are secured to the actuating shafts and quill shafts 91 and 90 respectively, supported in bearings 143 secured to the control plate 37. The shaft 91 and quill shaft 90 are concentrically mounted and extend rearwardly along the left-hand skid 6 to a rear supporting bearing 141 secured to the skid 6 to where they are secured to collars 88 and 89 which are formed integral with crank arms 142 and 144 respectively. The crank arms 142 and 144 are secured to connecting rods 145 and 146 which extend transversely of the frame unit C where they are pivotally connected with arms 147 which connect with connecting rods 145 and 146 to crank arms secured to the low and high speed clutch actuating shafts 148 and 149 respectively. Secured to the shafts 148 and 149 are clutch shifters 150 which engage the low and high speed clutches 65 and 64 for shifting the clutches along the power take-off shaft 10. Actuation of either the low speed or high speed pedals 120 and 121 results in the engagement of either the clutch 64 or 65 respectively. The operation which effects the engagement of clutch 65 or 64, also results in the rocker 84 being actuated to move the valve 80 to a position that will admit fluid pressure from the pipe 81 into the cylinder 77 and thus force the piston therein to move the clutch 71 into engagement with the gear 70. In the event that the end faces of the clutch jaws on the clutch 71 and gear 70 initially contact due to the yielding pressure produced by the fluid cylinder 77, the further rotation of the gear 70 relative to the clutch 71 will result in the relative rotation of the clutch jaws to a point where the clutch 71 will be forced into complete driving engagement with the gear 70. Release of either clutch 64 or 65 results in the applied pressure by the screws 92 being released from the arm 85, which permits the valve 80 to be automatically moved to a position that cuts off the supply of fluid pressure to the cylinder 77 and also exhausts the pressure in said cylinder to the atmosphere. The spring 94 then acts to disengage the clutch 71.

Means are provided in the control unit E for actuating the clutches 47 and 54 and 48 and 55 respectively. These actuating means are so formed that when clutch 47 is engaged, clutch 54 is disengaged, and so that when clutch 48 is engaged, clutch 55 must be disengaged and vice versa. This construction includes the clutch levers 122 and 123 which are mounted in quadrants 151 secured to cover plate 29 of the gear case 26.

Figure 4:
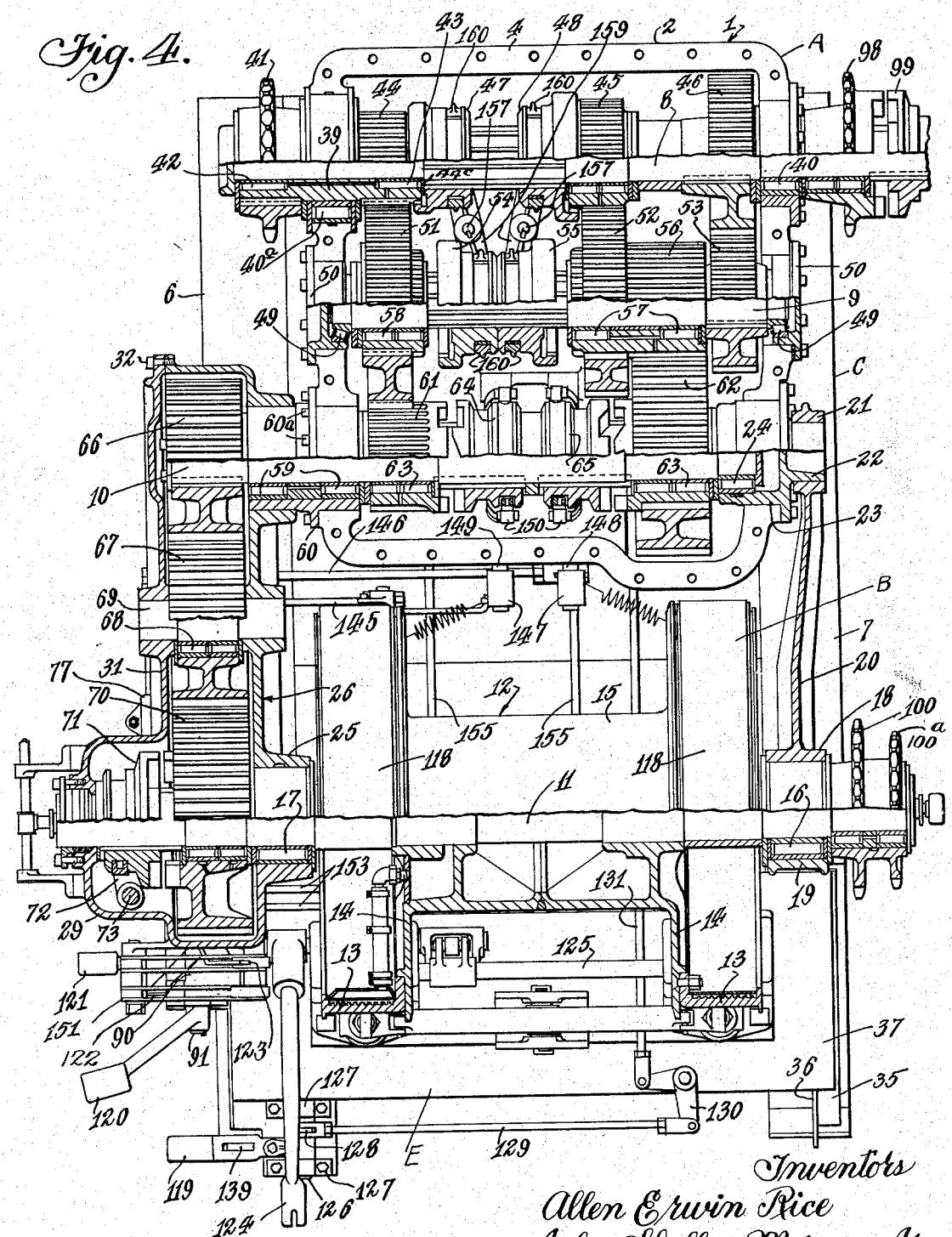
Figure 4 is a sectional plan view of the rotary drawworks embodying our invention taken substantially on a horizontal plane passing through the axis of the drumshaft.
Figure 5:
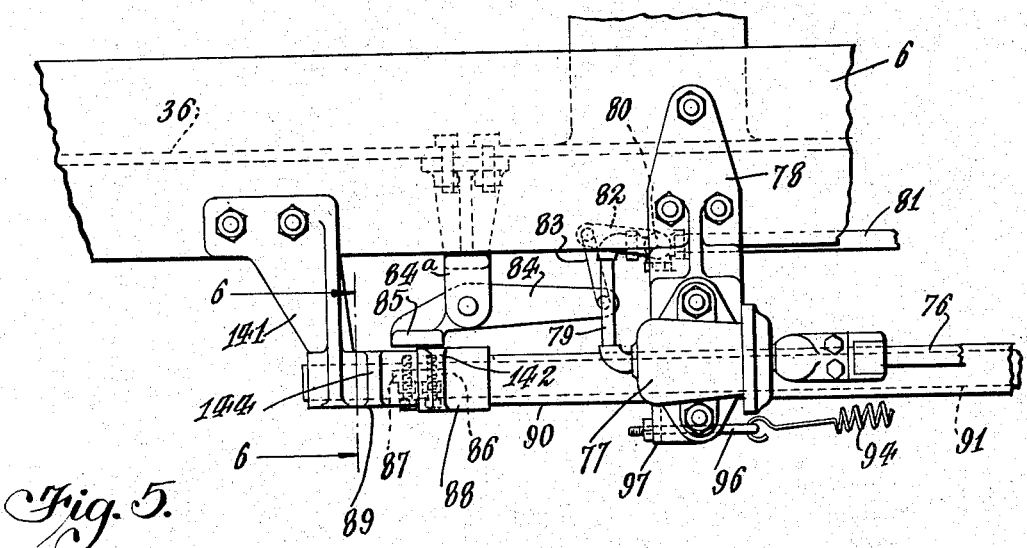
Figure 5 is an enlarged plan view of the drumshaft clutch operating mechanism embodying our invention.
Figure 6:
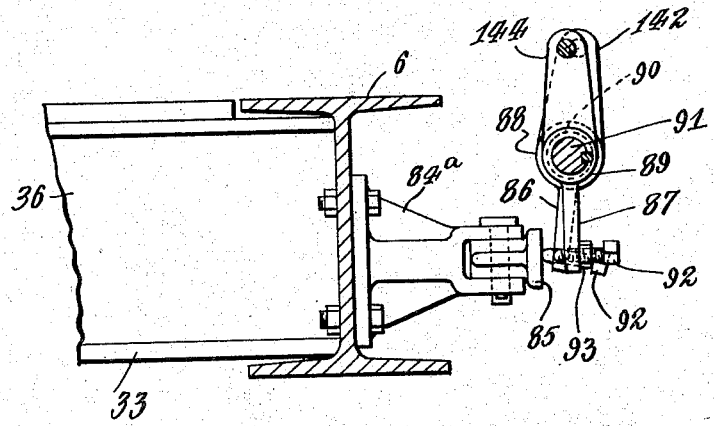
Figure 6 is a sectional view taken substantially on the line 6—6 of Figure 5.

The levers 122 and 123 are pivotally mounted on the pivot pin 152 secured to the frame 6 by brackets and below the pin 152 are pivotally connected to connecting rods 153. The connecting rods 153 extend transversely of the frame unit C and are connected at their opposite ends to bell cranks 154. Bell cranks 154 are connected to connecting rods 155 which extend rearwardly under the transmission case 1 and are connected to crank arms 156. Crank arms 156 are formed integral with collars secured to vertical extending shifter shafts 157. The shafts 157 extend through stuffing boxes 158 through the bottom of the transmission case 1 and are secured at their upper end within the transmission case 1 to clutch shifter levers 159. Secured to the opposed ends of the clutch shifter levers 159 are clutch actuating shoes 160 for actuating clutches 47 and 54 and 48 and 55 respectively. As the levers 159 are rotated, the clutch 47 may be engaged as viewed in Figure 4, while the clutch 54 is disengaged, or vice versa, and the clutch 48 may be engaged as viewed in Figure 4 while clutch 55 is disengaged, or vice versa.

It is also possible by this construction to disengage both the clutches 47 and 54, and the clutches 48 and 55, but it is not possible to simultaneously engage clutches 47 and 54 or the clutches 48 and 55. Segments 151 are provided with three notches indicating the neutral and oppositely engaged positions of the clutches 47 and 54, and 48 and 55.

The multiple speed transmission A provides a multiple speed drive for the drum shaft 11 as follows:

A low speed connection is provided when the clutch 48 is engaged and the clutch 54 is engaged. This of course disengages clutches 47 and 55. Clutch 65 is also engaged and the low speed drive is then through the following train of gears: Gear 44 to gear 51, the intermediate shaft through gear 53 to gear 46 of the pinion shaft; from gear 45 of the pinion shaft back to gear 52 of the intermediate shaft, and from gear 56 of the intermediate shaft to gear 62 on the power take-off shaft. As the clutch 65 is engaged, the power shaft is driven to drive the drumshaft 11 through the train of gears 66, 67 and 70 when the clutch 71 is engaged. The second speed is accomplished by the engagement of clutch 55 and clutch 54 and clutch 65. The drive in this instance is from gear 44 to gear 51, from gear 56 to gear 62.

The third speed is provided with the clutches 48, 47 and 65 engaged, thus establishing a drive from the pinion shaft 8 to the power take-off shaft 10 through the gears 45, 52, 56 and 62. The fourth speed is accomplished with the clutches 47, 55 and 65 engaged. The drive in this instance is from the gear 46 to the gear 53, from the gear 56 to the gear 62.

The direct or high speed is provided irrespective of what clutches are engaged except that the high speed clutch 64 is engaged and the low speed clutch 65 is disengaged. The high speed drive is a straight line drive from the quill shaft 39 through the idler gear 51 to the high speed gear 61 which is clutched to the power take-off shaft by the high speed clutch 64.

This type of construction when running in the hole, is such that the weight of the pipe within the hole being drilled requires the low speed clutch 65 to be engaged to lift the pipe when removing the pipe slips in the rotary machine, and this operation has been accomplished. The high speed drive is available at all times by merely pressing the high speed pedal 121 for the purpose of taking the elevator up after the joint of pipe has been set in the rotary machine or spider.

Having fully described our invention, it is to be understood that we do not wish to be limited to the details herein set forth, but our invention is of the full scope of the appended claims.

We claim:

1. In a device of the class described, the combination of a frame, a drumshaft rotatably supported by the frame, a hoisting drum mounted on the shaft, a gear case mounted to the rear of the hoisting drum, a pinion shaft journaled in the gear case, an intermediate shaft journaled in the gear case in advance of the pinion shaft, a power take-off shaft journaled in the gear case in advance of the intermediate shaft, gear means for driving the drumshaft from the power take-off shaft, gear means driving to the intermediate shaft from the pinion shaft at a plurality of different speeds, and gear means driving to the take-off shaft from the intermediate shaft at a plurality of different speeds.

2. In a rotary drawworks, the combination of a drumshaft, a hoisting drum mounted on the drumshaft, a change speed transmission mounted to the rear of the drumshaft, means for driving the drumshaft from the change speed transmission, including a clutch means, means for actuating the change speed transmission to change the speed of drive of the drumshaft, the latter said means being inoperable to actuate the clutch to engage the drive from the change speed transmission to the drumshaft until the change speed transmission has been actuated to change the speed of drive.

3. In a device of the class described, the combination of a frame, a drumshaft rotatably supported by the frame, a hoisting drum secured to the drumshaft, a gear case mounted to the rear of the hoisting drum, a pinion shaft journaled in the gear case, an intermediate shaft journaled in the gear case, a power take-off shaft journaled in the gear case, gear means for driving the drumshaft from the power take-off shaft, gear means for driving to the intermediate shaft at a plurality of speeds from the pinion shaft, and gear means for driving to the power take-off shaft at a plurality of speeds from the intermediate shaft.

4. In a device of the class described, the combination of a frame, a drumshaft rotatably supported by the frame, a hoisting drum secured to the shaft, a gear case mounted to the rear of the hoisting drum, a pinion shaft journaled in the gear case, an intermediate shaft journaled in the gear case, a power take-off shaft journaled in the gear case, a gear journaled on the drumshaft, clutch means for releasably securing the gear to the drumshaft, means for driving the latter said gear from the power take-off shaft, means for driving to the power take-off shaft at a plurality of speeds from the intermediate shaft, and means for driving to the intermediate shaft at a plurality of speeds from the pinion shaft.

5. In a rotary drawworks, the combination of a drumshaft, a drum secured to the drumshaft, a change speed transmission mounted to the rear of the drumshaft including a pinion shaft, an intermediate shaft, change speed gears mounted on the pinion shaft and the intermediate shaft, clutch means mounted on the pinion shaft and on the intermediate shaft for releasably and selectively clutching the gears to the pinion shaft and intermediate shaft for driving the intermediate shaft from the pinion shaft at a plurality of different speeds, a power take-off shaft, means for driving the power take-off shaft from the intermediate shaft, and means for releasably driving the drum shaft from the power take-off shaft.

6. In a rotary drawworks, the combination of a drumshaft, a drum mounted on and adapted to be driven with said shaft, a pinion shaft mounted to the rear of the drumshaft, an intermediate shaft, means for driving the intermediate shaft at a plurality of speeds from the pinion shaft, a power take-off shaft, high and low speed gears journaled on the power take-off shaft, high and low speed clutches for releasably clutching the high and low speed gears to the power take-off shaft, gears mounted on and adapted to be driven by the intermediate shaft to drive the high and low speed power take-off shaft gears, and means for releasably driving the drumshaft from the power take-off shaft.

7. In a device of the class described, the combination of a frame, a drumshaft rotatably supported by the frame, a drum mounted on the drumshaft, a change speed transmission mounted on the frame to the rear of the drumshaft, means for releasably driving the drumshaft from the change speed transmission, the change speed transmission including a pinion shaft and an intermediate shaft, a rotary machine driving sprocket journaled on the pinion shaft, means for releasably clutching the rotary machine drive sprocket to the pinion shaft, means for driving the pinion shaft to drive the rotary machine drive sprocket with the pinion shaft, and means mounted on the pinion shaft for driving the intermediate shaft and from the intermediate shaft to drive the pinion shaft to drive the rotary machine drive sprocket at a different speed.

8. In a drawworks of the type described, in combination, a counter-shaft, a drum shaft parallel thereto, means for supporting said shafts, a drum on said drum shaft, and means for establishing a driving connection between the counter-shaft and a rotary table, comprising speed reduction means rotatably mounted on said drum shaft and clutch controlled driving connections between the counter-shaft and said speed reducing means.

9. In a drawworks of the type described, in combination, a drum shaft, a counter-shaft, means for supporting said shafts, a drum on the drum shaft, a sprocket rotatably mounted on the counter-shaft, means for clutching said sprocket to the countershaft, and means for establishing a driving connection between said sprocket and a rotary table, comprising a pair of sprockets rotatably mounted on the drum shaft, one of said sprockets being operatively connected with the sprocket on the counter-shaft and the other being provided for establishing a driving connection with the rotary table.

10. In a drawworks of the type described, in combination, a drum shaft, a counter-shaft, means for supporting said shafts, a drum on the drum shaft, and means for establishing a driving connection between the counter-shaft and a rotary table, comprising a sprocket rotatably mounted on the drum shaft, means including a clutch for driving said sprocket from the counter-shaft, and a second sprocket on the drum shaft driven by the first mentioned sprocket.

11. In a drawworks of the type described, in combination, a drum shaft, a counter-shaft, means for supporting said shafts, a drum on the drum shaft, and means for establishing a driving connection between the counter-shaft and a rotary table, comprising a pair of coaxial sprockets rotatably mounted on the drum shaft, one of said sprockets being operatively connected with the sprocket on the counter-shaft and the other being provided for establishing a driving connection with the rotary table, and means for connecting said sprockets together for rotation one with the other.

12. In a drawworks of the type described, the combination of a drum shaft, a countershaft, means for supporting said shafts, a drum on the drum shaft, an engine drive sprocket mounted on the countershaft, a rotary drive sprocket rotatably mounted on the countershaft, means for clutching said sprocket to the countershaft, means for establishing a driving connection between said sprocket and a rotary table comprising a pair of sprockets rotatably mounted on the drum shaft, one of said sprockets being operatively connected with the sprocket on the countershaft and the other being provided for establishing a connection with the rotary table, and means interposed between the engine drive sprocket and the latter said sprocket for driving the latter said sprocket at a multiple number of speeds.

13. In a rotary drilling apparatus, the combination of a drum shaft, means rotatably supporting the drum shaft, a countershaft supported to the rear of the drum shaft, a rotary table drive means mounted on one end of the drum shaft, means for driving the rotary table drive means from the countershaft, the rotary table drive means including a rotary table drive member mounted on the said end of the drum shaft and driven from the last said means, and means providing a multiple speed drive through said connections to the rotary table drive member.

14. A drawworks of the type described including a multiple speed rotary table drive means comprising a drum shaft, a countershaft, a double sprocket mounted on one end of the drum shaft, means connecting the countershaft and one sprocket of the double sprocket, means connecting the other sprocket of the double sprocket with a rotary table, and means providing a multiple speed drive through the said connections to the rotary table.

15. In a drawworks of the type described, the combination of a drum, a drum shaft, a countershaft, means for supporting said shafts, a drum on the drum shaft, an engine drive sprocket mounted on the countershaft, a rotary drive sprocket rotatably mounted on the countershaft, means for clutching said rotary sprocket to the countershaft, means for establishing a driving connection between said sprocket and a rotary table comprising a pair of sprockets rotatably mounted on the drum shaft, one of said sprockets being operatively connected with the sprocket on the countershaft and the other being provided for establishing a connection with the rotary table, and means including selective clutch means to effect a drive to the latter said sprocket at one speed, and a gear reduction means to effect a slower speed drive to the latter said sprocket, the said selective clutch and gear reduction means being interposed between the latter said sprocket and the engine drive sprocket.

16. In a drawworks, the combination of a countershaft, a drive means, clutch means to place the drive means in driving relation with the countershaft, a power take-off shaft, means whereby the countershaft may drive the power take-off shaft, a drum shaft, means whereby the power take-off shaft may drive the drum shaft, means on the power take-off shaft whereby the drive means may drive the power take-off shaft independently of the countershaft, a rotary drive sprocket mounted on the countershaft, and means to connect the rotary drive sprocket in driving relation with the countershaft.

17. In a drawworks, the combination of a unitary frame structure, a countershaft, a drive means, means including selective clutch means to place the drive means in driving relation with the countershaft to drive said shaft at a plurality of speeds, a power take-off shaft, means whereby the countershaft may drive the power take-off shaft, a drum shaft, means whereby the power take-off shaft may drive the drum shaft, means on the power take-off shaft whereby the drive means may drive the power take-off shaft independently of the countershaft, a rotary drive sprocket mounted on the countershaft, and means to connect the rotary drive sprocket in driving relation with the countershaft.

18. In a drawworks, the combination of a countershaft, a drawworks drive means, clutch means to place the drive means in driving relation with the countershaft, a spooling drum, a power take-off shaft, means whereby the power take-off shaft may drive the drum, transmission means for driving the power take-off shaft directly from the drawworks drive means independently of the countershaft, other transmission means for indirectly driving the power take-off shaft from the drive means through the countershaft at a plurality of different relative speeds, control means for adjusting the transmission means to obtain either a direct or an indirect drive to the power take-off shaft to vary the speed thereof relative to the drive means, a rotary drive means mounted on the countershaft, and means to connect the rotary drive means in driving relation with the countershaft.

19. In a drawworks, the combination of a countershaft, a drawworks drive means, a spooling drum, a power take-off shaft, means whereby the power take-off shaft may drive the drum, a primary driven means for directly driving the countershaft from the drive means, a secondary driven means for directly driving the power take-off shaft from the drive means independently of the countershaft, transmission means between the countershaft and the power take-off shaft, control means adjustable to cause the power take-off shaft to be driven directly through the secondary driven means, or indirectly through the primary driven means, the countershaft and the transmission means, a rotary drive means mounted on the countershaft, and means to connect the rotary drive means in driving relation with the countershaft.

20. In a drawworks, the combination of a countershaft, a drawworks drive means, a spooling drum, a power take-off shaft, means whereby the power take-off shaft may drive the drum, a primary driven means, a clutch connection for directly driving the countershaft from the drive means, a secondary driven means for directly driving the power take-off shaft from the drive means independently of the countershaft, transmission means between the countershaft and the power take-off shaft, control means adjustable to cause the power take-off shaft to be driven directly through the secondary driven means, or indirectly through the primary driven means, the countershaft and the transmission means, a rotary drive means mounted on the countershaft, and means to connect the rotary drive means in driving relation with the countershaft.

21. In a drawworks, the combination of a unitary frame structure, four parallel shafts rotatably supported by said structure, a drum mounted on one of the shafts, a driving connection between the drumshaft and the second of said shafts, a third shaft, a fourth shaft, a rotary drive sprocket and a clutch for the same on one of said last named two shafts, and adapted to be driven by the same shaft, a drive means mounted on the fourth shaft, means forming a relative non-rotative connection between the drive means and the fourth shaft, transmission means including a driven member mounted on the fourth shaft for directly driving the second shaft, other transmission means for indirectly driving the second shaft from the fourth shaft through the third shaft, and control means for adjusting the transmission means to obtain either a direct or indirect drive to the second shaft to vary the speed thereof relative to the drive means.

22. In a drawworks, the combination of a unitary frame structure, four parallel shafts rotatively supported by said structure, a drum mounted on one of the shafts, a driving connection between the drumshaft and the second of said shafts, a third shaft, a fourth shaft, a rotary drive sprocket supported on one of the last two named shafts and adapted to be driven by its supporting shaft, a drive means mounted on the fourth shaft, means to selectively drive the shaft which supports the rotary sprocket at a plurality of speeds relative to said drive means, and transmission means, including control means for selectively driving the second shaft at a plurality of speeds from the fourth shaft.

23. In a drawworks, the combination of a countershaft, a drive means rotatably mounted axially of the countershaft and encircling a portion thereof, clutch means whereby the drive means may directly drive the countershaft, a power take-off shaft, means whereby the countershaft may drive the power take-off shaft, a drum shaft, means whereby the power take-off shaft may drive the drum shaft, and means on the power take-off shaft whereby the drive means may directly drive the power take-off shaft independently of the countershaft.

24. In a drawworks, the combination of a countershaft, a drawworks drive means rotatably mounted axially of said countershaft and encircling a portion thereof, a spooling drum, a power take-off shaft, means whereby the power take-off shaft may drive the drum, transmission means for driving the power take-off shaft directly from the drawworks drive means independently of the countershaft at one forward speed, other transmission means for indirectly driving the power take-off shaft from the drive means through the countershaft at a plurality of forward speeds, and control means for adjusting the transmission means to obtain either a direct or an indirect drive to the power take-off shaft to vary the speed thereof relative to the drive means.

25. In a drawworks, the combination of a countershaft, a drawworks drive means rotatably mounted axially of said countershaft and encircling a portion thereof, a spooling drum, a power take-off shaft, means whereby the power take-off shaft may drive the drum, a primary driven means for directly driving the countershaft from the drive means, a secondary driven means for directly driving the power take-off shaft from the drive means at one forward speed independently of the countershaft, transmission means between said countershaft and the power take-off shaft to drive the latter at another forward speed, and control means adjustable to cause the power take-off shaft to be driven directly through the secondary driven means, or indirectly through the primary driven means, the countershaft and the transmission means.

26. In a drawworks, the combination of a unitary frame structure, four parallel shafts rotatively supported by said structure, a drum mounted on the drumshaft, a driving connection between one shaft and the second of said shafts, a third shaft, a fourth shaft, drive means mounted on the fourth shaft, a rotary drive member mounted on the fourth shaft, clutch means whereby the fourth shaft may drive the rotary drive member, selective means to directly connect the drive means in driving relation with the fourth shaft, transmission means including a selective means coordinated with the first selective means to indirectly connect the drive means in driving relation with the fourth shaft through the third shaft to drive the fourth shaft at different speeds relative to the drive means, and transmission means to drive the second shaft from the drive means independently of the third and fourth shafts including clutch means to render the second shaft stationary if desired when driving the rotary drive member.

27. In a rotary drawworks, the combination of a frame structure having two vertical posts and bearings for rotatably supporting four parallel shafts, a drum mounted on one of said shafts, driving connections between said drum shaft and the second of said shafts, driving connections between said second shaft and a third of said shafts, driving means for the drawworks operatively connected with the third shaft and the fourth shaft for independently driving either the third or fourth shaft selectively, and a rotary drive sprocket carried by the fourth shaft.

28. In combination with a unitary rotary drawworks, the combination of a countershaft, a drive sprocket rotatably mounted axially of the countershaft and encircling a portion thereof, a rotary drive sprocket mounted on the countershaft and adapted to be non-rotatably secured relative thereto, a gear non-rotatably secured to the drive sprocket, a second shaft mounted in the structure parallel with the countershaft, a gear mounted on the second shaft in mesh with the first said gear for driving said shaft, a second gear mounted on the second shaft, a second gear mounted on the countershaft in mesh with the first said second gear, and selective clutch means for placing the countershaft in either direct driving relation with the drive sprocket or in indirect driving relation with the driving sprocket through the second shaft and the said sets of meshing gears.

29. In a drawworks of the class described, the combination of: a pair of frame constructions; a jack shaft, a line shaft, a drum shaft, and a countershaft supported by said pair of frame constructions, each of said shafts being parallel to each other and extending entirely across the drawworks; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; and jack shaft drive means whereby said jack shaft may be driven.

30. In a drawworks of the class described, the combination of: a pair of frame constructions; a jack shaft, a line shaft, a drum shaft, and a countershaft supported by said pair of frame constructions, each of said shafts being parallel to each other and extending entirely across the drawworks; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; and jack shaft drive means whereby said jack shaft may be driven.

31. In a drawworks of the class described, the combination of: a pair of frame constructions; a jack shaft, a line shaft, a drum shaft, and a countershaft supported by said pair of frame constructions, each of said shafts being parallel to each other and extending entirely cross the drawworks; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; auxiliary countershaft drive means whereby said jack shaft may drive said countershaft; and jack shaft drive means whereby said jack shaft may be driven.

32. In a drawworks of the class described, the combination of: a pair of frame constructions, a jack shaft, a line shaft, a drum shaft, and a countershaft supported by said pair of frame constructions, each of said shafts being parallel to each other and extending entirely across the drawworks; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; an auxiliary drive means whereby said countershaft may drive said line shaft; and jack shaft drive means whereby said jack shaft may be driven.

33. In a drawworks, the combination of a countershaft, a drive means rotatably mounted on the countershaft, clutch means to releasably connect said drive means in direct driving relation with said countershaft, a cat shaft having a cathead supported thereon, a drum shaft having a spooling drum supported thereon, rotary drive means mounted on the countershaft and adapted to be driven thereby, transmission means including a releasable clutch on the drum shaft whereby the countershaft may drive the drum, and transmission means including a releasable clutch means whereby the drive means may selectively drive either the cat shaft or the drum shaft, or both, independently of the countershaft.

34. In a drawworks, the combination of a unitary supporting structure, a countershaft rotatably supported on said structure, a drive means rotatably supported on said countershaft, clutch means to releasably connect said drive means in direct driving relation with said countershaft, a cathead shaft having a cathead supported thereon, said cathead shaft being supported on said structure higher than and parallel with the countershaft, a drum shaft having a spooling drum thereon, said drum shaft being supported on said structure below and parallel with the cathead shaft, transmission means including a releasable clutch on said drum shaft whereby the countershaft may drive said drum shaft, and transmission means including releasable clutch means whereby the drive means may selectively drive either the cathead shaft or the drum, or both, independently of the countershaft.

35. In a drawworks, the combination of a countershaft, a drive means rotatably mounted on the countershaft, clutch means to releasably connect said drive means in direct driving relation with said countershaft, a cathead shaft positioned above and parallel with the countershaft and having a cathead supported thereon, a drum shaft having a spooling drum supported thereon, rotary drive means journaled on the countershaft, clutch means for releasably coupling the rotary drive means to the countershaft, transmission means including a releasable clutch on said drum shaft whereby the countershaft may drive said drum, and transmission means including a releasable clutch whereby the drive means may selectively drive the cathead shaft independently of the countershaft.

36. In a drawworks, the combination of a unitary supporting structure, a countershaft rotatably supported on said structure, a drive means rotatably mounted axially of the countershaft and encircling a portion thereof, clutch means to releasably connect said drive means in direct driving relation with the countershaft, a cathead shaft having a cathead supported thereon, said cathead shaft being supported on said structure higher than, and parallel with the countershaft, a drum shaft having a spooling drum supported thereon, said drum shaft being supported on said structure below and parallel with the cathead shaft, transmission means including a releasable clutch on said drum shaft whereby the countershaft may drive said drum shaft, and transmission means including a releasable clutch whereby the drive means may selectively drive the cathead shaft independently of the countershaft.

37. In a drawworks, the combination of a supporting structure, a driven shaft rotatably supported to the rear of said structure, a drum shaft rotatably supported to the front of said structure and parallel with the driven shaft, a drive means rotatably mounted axially of and encircling a portion of the driven shaft, clutch means to releasably connect the drive means in direct driving relation with the driven shaft, a third shaft having a cathead supported thereon, said third shaft being rotatably supported on said structure higher than, but parallel with, the driven shaft, a spooling drum on the drum shaft, means including a releasable clutch on the drum shaft whereby the driven shaft may drive the drum shaft, and transmission means including a releasable clutch whereby the drive means may selectively drive the third shaft independently of the driven shaft.

38. In a drawworks, the combination of a countershaft, a drive means rotatably mounted on the countershaft, clutch means to releasably connect the drive means in direct driving relation with the countershaft, a driven shaft disposed in parallelism with said countershaft, a spooling drum, means whereby the driven shaft may drive the drum, transmission means including a releasable clutch on the driven shaft whereby the countershaft may selectively drive the driven shaft, and transmission means including a second releasable clutch on the driven shaft whereby the drive means may selectively drive the driven shaft independently of the countershaft.

39. In a drawworks, the combination of a countershaft, drive means rotatably mounted axially of and encircling a portion of the countershaft, clutch means for releasably connecting the drive means in direct driven relation with the countershaft, a rotary machine drive means mounted on the countershaft, means for connecting the rotary machine drive means in drive relation with the countershaft, a driven shaft disposed in parallelism with the countershaft, a spooling drum, means whereby the driven shaft may drive the drum, transmission means including a releasable clutch on the driven shaft whereby the countershaft may selectively drive the driven shaft, and transmission means including a second releasable clutch on the driven shaft whereby the drive means may selectively drive the driven shaft independently of the countershaft.

40. In a drawworks, the combination of a jack shaft, a drive means mounted on the jack shaft and adapted to drive the jack shaft, a driven shaft, a spooling drum, means whereby the driven shaft may drive the drum, transmission means between the jack shaft and the driven shaft for driving the latter shaft at one forward speed, including a driving element rotatably mounted on the jack shaft, clutch means to releasably connect the driving element in direct driving relation with the jack shaft, and a second transmission means adapted to be driven also by the jack shaft for driving the driving element of the first transmission means to effect a second forward speed of the driven shaft, said second transmission means including a clutch adapted to engage an element of the second transmission means to effect the second forward speed upon said first clutch being disengaged from driving engagement with the driving element.

41. In a drawworks, the combination of a jack shaft, a drive means rotatably mounted on the jack shaft and adapted to drive said jack shaft, clutch means to releasably connect said drive means in direct driving relation with said jack shaft, a driven shaft, a spooling drum, means whereby said driven shaft may drive the drum, transmission means between said jack shaft and said driven shaft for driving the latter shaft at one forward speed, including a driving element rotatably mounted on the jack shaft, clutch means to releasably connect said driving element in direct driving relation with said jack shaft, a second transmission means adapted to be driven also by said jack shaft for driving said driving element of the first transmission means to effect a second forward speed of the driven shaft, said second transmission means including a clutch adapted to engage an element of said second transmission means to effect the second forward speed upon said first clutch being disengaged from driving engagement with said driving element, and a third transmission means including a releasable clutch whereby the drive means may selectively drive the driven shaft at a third speed independently of the jack shaft.

42. In a drawworks, the combination of a countershaft, a drive means rotatably mounted axially of and encircling a portion of the countershaft, an intermediate shaft, transmission means including a releasable clutch whereby the drive means may drive the intermediate shaft, a drum shaft, a spooling drum mounted on the drum shaft, transmission means whereby the intermediate shaft may drive the countershaft, a rotary drive means mounted on the countershaft and adapted to be driven thereby, transmission means whereby the countershaft may drive the drum, clutch means on the countershaft to clutch the drive means in direct driving relation with the countershaft upon the first named clutch being disengaged, and transmission means whereby the drive means may drive the drum independently of the countershaft.

43. In a drawworks, the combination of a countershaft, a drive means rotatably mounted on the countershaft, an intermediate shaft, transmission means including a releasable clutch whereby the drive means may drive the intermediate shaft, a drum shaft, a spooling drum mounted on the drum shaft, transmission means whereby the intermediate shaft may selectively drive the countershaft, rotary drive means mounted on the countershaft and adapted to be driven thereby, transmission means whereby the countershaft may selectively drive the drum, and transmission means whereby the drive means may selectively drive the drum independently of the countershaft.

44. In a drawworks, the combination of a countershaft, a drive means rotatably mounted on the countershaft, an intermediate shaft, transmission means including a releasable clutch whereby the drive means may drive the intermediate shaft, a drum shaft, a spooling drum mounted upon the drum shaft, transmission means whereby the intermediate shaft may selectively drive the countershaft, a rotary drive means mounted on the countershaft and adapted to be driven therewith, transmission means whereby the countershaft may drive the drum, and clutch means on the countershaft to clutch the drive means in direct driving relation with the countershaft upon the first named clutch being disengaged.

45. In a drawworks, the combination of a countershaft, a drive means rotatably mounted on the countershaft, an intermediate shaft, transmission means including a releasable clutch whereby the drive means may drive the intermediate shaft, a drum shaft, a spooling drum rotatably supported on the drum shaft, transmission means whereby the intermediate shaft may drive the countershaft, rotary drive means mounted on the countershaft and adapted to be driven thereby, and transmission means whereby the countershaft may drive the drum.

46. In a drawworks, the combination of a countershaft, a drive means rotatably mounted axially of and encircling a portion of the countershaft, an intermediate shaft positioned in advance of the countershaft and parallel therewith, a drum shaft positioned in advance of the intermediate shaft and parallel therewith, a frame, means carried by the frame for rotatably supporting said shafts, transmission means including a releasable clutch whereby the drive means may drive the intermediate shaft, transmission means whereby the intermediate shaft may drive the countershaft, rotary drive means, clutch means for releasably clutching the rotary drive means to the countershaft, and transmission means whereby the countershaft may drive the drum.

47. In a drawworks, the combination of a jack shaft, a drive means mounted on the jack shaft and adapted to drive said jack shaft, a countershaft, rotary drive means mounted on the countershaft and adapted to be driven thereby, a driven shaft, a spooling drum, means whereby said driven shaft may drive the drum, selective transmission means between said jack shaft and said driven shaft for driving the latter shaft at one forward speed, including a releasable clutch means, transmission means whereby said jack shaft may drive the countershaft, and selective transmission means between said countershaft and said driven shaft for driving the latter shaft at a second forward speed, said second speed transmission including a releasable clutch means that is operative to effect said second speed drive upon the first releasable clutch means being disengaged from its operative driving engagement.

48. In a drawworks, the combination of a jack shaft, a drive means mounted on the jack shaft and adapted to drive said jack shaft, a countershaft, rotary drive means mounted on the countershaft and adapted to be driven thereby, a driven shaft, a spooling drum, means whereby said driven shaft may drive the drum, selective transmission means between said jack shaft and said driven shaft for driving the latter shaft at one forward speed, including a releasable clutch means, transmission means whereby said jack shaft may drive the countershaft, selective transmission means between said countershaft and said driven shaft for driving the latter shaft at a second forward speed, said second speed transmission including a releasable clutch means that is operative to effect said second speed drive upon the first releasable clutch means being disengaged from its operative driving engagement, and a fourth transmission means including a releasable clutch whereby the drive means may selectively drive the driven shaft at a third speed independently of the jack shaft and the countershaft.

49. In a drawworks, the combination of a countershaft, a drive means rotatably mounted axially of and encircling a portion of the countershaft, an intermediate shaft disposed in parallelism with the countershaft, a transmission means including coordinated releasable clutch means whereby the drive means may selectively drive either the countershaft or the intermediate shaft, transmission means between the countershaft and the intermediate shaft whereby the driven one of said shafts may drive the other shaft, rotary drive means on one of said shafts and adapted to be driven thereby, a spooling drum, and means whereby the countershaft may drive the drum.

50. In a drawworks, the combination of a countershaft, a drive means rotatably mounted axially of and encircling a portion of the countershaft, an intermediate shaft disposed in parallelism with the countershaft, transmission means including coordinated releasable clutch means whereby the drive means may selectively drive either the countershaft or the intermediate shaft, transmission means between the countershaft and the intermediate shaft whereby the driven one of said shafts may drive the other shaft, rotary drive means mounted on one of said shafts and adapted to be driven thereby, a spooling drum, means whereby the countershaft may drive the drum, and means whereby the said drive means may selectively drive said spooling drum independently of said shafts.

51. In a rotary drawworks, the combination of a countershaft, a drive means rotatably mounted axially of and encircling a portion of the countershaft, an intermediate shaft disposed in parallelism with said countershaft, transmission means including coordinated releasable clutch means on the countershaft and intermediate shaft whereby the drive means may selectively drive either the countershaft or the intermediate shaft, transmission means between the countershaft and the intermediate shaft whereby the driven one of said shafts may drive the other shaft, rotary drive means mounted on one of said shafts and adapted to be driven thereby, a spooling drum, and means whereby either of said shafts may selectively drive said spooling drum independently of the other.

52. In a rotary drawworks, the combination of a countershaft, a drive means rotatably mounted axially of and encircling a portion of the countershaft, an intermediate shaft positioned parallel with the countershaft, transmission means including a coordinated releasable clutch means on the countershaft and the intermediate shaft whereby the drive means may selectively drive either the countershaft or the intermediate shaft, transmission means between the countershaft and the intermediate shaft whereby the driven one of said shafts may drive the other shaft, rotary drive means mounted on one of said shafts and adapted to be driven thereby, a spooling drum, and means whereby either of said shafts may separately or both of said shafts in series may selectively drive the spooling drum.

53. In a drawworks, the combination of a countershaft, drive means rotatably mounted on the countershaft, an intermediate shaft positioned parallel with and in advance of the countershaft, transmission means including coordinated releasable clutch means on the countershaft and the intermediate shaft whereby the drive means may selectively drive either the countershaft or the intermediate shaft, transmission means between the countershaft and the intermediate shaft whereby the driven one of said shafts may drive the other shaft, rotary drive means mounted on one of the shafts and adapted to be driven thereby, a spooling drum, means whereby either of said shafts separately or both of said shafts in series may selectively drive the spooling drum, and means whereby said drive means may selectively drive said spooling drum independently of both said shafts.

54. In a drawworks, the combination of a shaft, a drive means on the shaft and adapted to drive the shaft, a second shaft, rotary drive means mounted on the second shaft adapted to be driven thereby, a driven shaft, a spooling drum, means whereby the driven shaft may drive the drum, selective transmission means between the first shaft and the driven shaft for driving the latter shaft at one forward speed, clutch means to releasably connect the driving element of the transmission in direct driving relation with the first shaft, transmission means whereby the first shaft may drive the second shaft, and selective transmission means between the second shaft and the driving element for driving the driven shaft at a second forward speed by means of the first said transmission, said second speed transmission including a releasable clutch means that is operative to effect the second speed drive upon the first releasable clutch means being disengaged from its operative driving engagement.

55. In a drawworks, the combination of a shaft, a drive means on the shaft and adapted to drive the shaft, a second shaft, rotary drive means mounted on the second shaft adapted to be driven thereby, a driven shaft, a spooling drum, means whereby the driven shaft may drive the drum, selective transmission means between the first shaft and the driven shaft for driving the latter shaft at one forward speed, clutch means to releasably connect the driving element of the transmission in direct driving relation with the first shaft, transmission means whereby the first shaft may drive the second shaft, selective transmission means between the second shaft and the driving element for driving the driven shaft at a second forward speed by means of the first said transmission, said second speed transmission including a releasable clutch means that is operative to effect the second speed drive upon the first releasable clutch means being disengaged from its operative driving engagement, and a fourth transmission means including a releasable clutch whereby the drive means may selectively drive the driven shaft at a third speed independently of the first shaft and the second shaft.

56. In a device of the class described, the combination of a frame, a drum shaft supported by the frame, a hoisting drum on the shaft, a gear case connected to said frame to the rear of the hoisting drum, a quill sleeve rotatably supported by the case, drive means positioned at the outer end of the sleeve for imparting rotation thereto, a drive gear within the case enclosure on the inner end of the sleeve and adapted to be driven thereby, a pinion shaft within the case, said shaft being rotatably supported at one end on bearing means within the sleeve, an intermediate shaft, means for supporting the intermediate shaft within the case, a power take-off shaft, means for rotatably supporting the power take-off shaft within the case, clutch means to releasably connect the pinion shaft in direct driving relation with the quill sleeve, gear means for driving the intermediate shaft from the pinion shaft, gear means for driving the power take-off shaft from the intermediate shaft at one forward speed, an idler gear on the intermediate shaft meshing with the drive gear on the quill sleeve, a driven gear rotatably mounted on the power take-off shaft adapted to mesh with and be driven by the idler gear, clutch means to releasably connect said driven gear in direct driving relation with the power take-off shaft to drive the latter at an increased forward speed, and means to drive the hoisting drum from the power take-off shaft.

57. In a device of the class described, the combination of a frame, a drum shaft supported by the frame, a hoisting drum on the shaft, a gear case connected to said frame to the rear of the hoisting drum, a quill sleeve rotatably supported by the case, drive means positioned at the outer end of the sleeve for imparting rotation thereto, a drive gear within the case enclosure on the inner end of the sleeve and adapted to be driven thereby, a pinion shaft within the case, said shaft being rotatably supported at one end on bearing means within the sleeve, an intermediate shaft, means for supporting the intermediate shaft within the case, a power take-off shaft, means for rotatably supporting the power take-off shaft within the case, clutch means to releasably connect the pinion shaft in direct driving relation with the quill sleeve, gear means for driving the intermediate shaft from the pinion shaft, gear means for driving the power take-off shaft from the intermediate shaft at one forward speed, an idler gear on the intermediate shaft meshing with the drive gear on the quill sleeve, a driven gear rotatably mounted on the power take-off shaft adapted to mesh with and be driven by the idler gear, clutch means to releasably connect said driven gear in direct driving relation with the power take-off shaft to drive the latter at an increased forward speed, means to drive the hoisting drum from the power take-off shaft, and a rotary drive means mounted on the pinion shaft and adapted to be driven thereby.

58. In a device of the class described, the combination of a frame, a drum shaft supported by the frame, a hoisting drum on the shaft, a gear case connected to said frame to the rear of the hoisting drum, a quill shaft rotatably supported by the case, drive means positioned at the outer end of the quill shaft for imparting rotation thereto, a drive means within the case enclosure on the inner end of the quill shaft and adapted to be driven thereby, a pinion shaft within the case, said shaft being rotatably supported at one end on bearing means within the quill shaft, an intermediate shaft rotatably supported within the case, a power take-off shaft rotatably supported within the case, clutch means to releasably connect the pinion shaft in direct driving relation with the quill shaft, gear means for driving the intermediate shaft from the pinion shaft, gear means for driving the power take-off shaft from the intermediate shaft at one forward speed, gear means for driving the power take-off shaft from the pinion shaft independently of the intermediate shaft and at another forward speed, idler means on the intermediate shaft in driving relation with the drive means on the quill shaft, a driven means rotatably mounted on the power take-off shaft adapted to be driven by the idler means, clutch means to releasably connect the driven means in direct driving relation with the power take-off shaft to drive the latter shaft at an increased forward speed, and means to drive the hoisting drum from the power take-off shaft.

59. In a device of the class described, the combination of a frame, a drum shaft supported by the frame, a hoisting drum on the shaft, a gear case connected to said frame to the rear of the hoisting drum, a quill sleeve rotatably supported by said case, drive means positioned at the outer end of said sleeve for imparting rotation thereto, a drive gear within said case enclosure on the inner end of said sleeve and adapted to be driven thereby, a pinion shaft within said case, said shaft being rotatably supported at one end on bearing means within said sleeve, an intermediate shaft and a power take-off shaft rotatably supported within said case, clutch means to releasably connect said pinion shaft in direct driving relation with the quill sleeve, gear means for driving the intermediate shaft from the pinion shaft at one speed, an intermediate gear on the intermediate shaft meshing with gear means for driving the power take-off shaft from the intermediate shaft and driven by the drive gear on the quill sleeve, clutch means to releasably connect said intermediate gear in direct driving relation with the intermediate shaft to drive said shaft at a second speed, a driven gear rotatably mounted on the power take-off shaft adapted to mesh with and be driven by the intermediate gear, clutch means to releasably connect said driven gear in direct driving relation with the power take-off shaft to drive the latter at an increased forward speed, and means to drive the hoisting drum from said power take-off shaft.

60. In a device of the class described for driving a drawworks drum, the combination of a gear case, a quill sleeve rotatably supported by the same, drive means positioned at the outer end of said sleeve adapted for imparting rotation thereto, a drive gear within said case enclosure on the inner end of said sleeve and adapted to be driven thereby, a pinion shaft within said case, the shaft being rotatably supported at one end on bearing means within the sleeve, an intermediate shaft rotatably supported within said case, a driven gear on the intermediate shaft meshing with and driven by the drive gear on the quill sleeve, releasable clutch means on the pinion shaft to connect said shaft in direct driving relation with the quill sleeve, releasable clutch means on the intermediate shaft to connect said shaft in direct driving relation with the driven gear, coordinated operating means to operatively engage said pinion shaft and intermediate shaft clutch means alternately whereby only one of said shafts may be driven at a time directly by the drive means, gear means between the pinion shaft and the intermediate shaft whereby the driven one of said shafts may drive the other shaft, a power take-off shaft rotatably supported within said case, gear means for selectively driving the power take-off shaft from either the pinion shaft or the intermediate shaft, and means on said power take-off shaft for driving said drum.

61. In a device of the class described for driving a drawworks drum, the combination of a gear case, a quill sleeve rotatably supported by the same, drive means positioned at the outer end of the sleeve adapted for imparting rotation thereto, a drive gear within said case enclosure on the inner end of the sleeve and adapted to be driven thereby, a pinion shaft within said case, the shaft being rotatably supported at one end on bearing means within the sleeve, an intermediate shaft rotatably supported within the case, a rotary drive means mounted on one of said shafts and adapted to be driven thereby, a driven gear on the intermediate shaft meshing with and driven by the drive gear on the quill sleeve, releasable clutch means on the pinion shaft to connect the shaft in direct driving relation with the quill sleeve, releasable clutch means on the intermediate shaft to connect the shaft in direct driving relation with the driven gear, coordinated operating means to operatively engage said pinion shaft and intermediate shaft clutch means alternately whereby only one of said shafts may be driven at a time directly by the drive means, gear means between the pinion shaft and the intermediate shaft whereby the driven one of said shafts may drive the other shaft, a power take-off shaft rotatably supported within said case, gear means for selectively driving the power take-off shaft from either the pinion shaft or the intermediate shaft, and means on said power take-off shaft for driving said drum.

62. In a device of the class described for driving a drawworks drum, the combination of a gear case, a quill sleeve rotatably supported by the case, drive means positioned at the outer end of said sleeve adapted for imparting rotation thereto, a drive gear within said case enclosure on the inner end of said sleeve and adapted to be driven thereby, a pinion shaft within said case, said shaft being rotatably supported at one end on bearing means within said sleeve, an intermediate shaft rotatably supported within said case, an intermediate gear on the intermediate shaft meshing with and driven by the drive gear on the quill sleeve, releasable clutch means on the pinion shaft to connect said shaft in direct driving relation with the quill sleeve, releasable clutch means on the intermediate shaft to connect said shaft in direct driving relation with the intermediate gear, coordinated operating means to operatively engage said pinion shaft and intermediate shaft clutch means alternately whereby only one of said shafts may be driven at a time directly by the drive means, gear means between the pinion shaft and the intermediate shaft whereby the driven one of said shafts may drive the other shaft, a power take-off shaft rotatably supported within said case, gear means for selectively driving the power take-off shaft from either the pinion shaft or the intermediate shaft, a driven gear rotatably mounted on the power take-off shaft adapted to be driven by said intermediate gear, clutch means to releasably connect said driven gear in direct driving relation with the power take-off shaft to drive the latter at another forward speed, and means on said power take-off shaft for driving said drum.

63. In a hoisting mechanism, the combination of a drum shaft, a hoisting drum mounted on the drum shaft, a drive shaft, means including a releasable jaw type clutch on the drum shaft whereby the drive shaft may drive said drum, drive means including a releasable clutch on the drive shaft whereby the same may be driven, means to actuate the drive shaft clutch into driving engagement, means to actuate the drum shaft clutch, said means including a fluid pressure actuated power means controlled by a valve means, said valve means being actuated incidental to the operation of the drive shaft clutch actuating means to admit fluid pressure to the power means for yieldably urging said drum shaft clutch into engagement.

64. In a device of the class described for driving a drawworks drum, the combination of a gear case, a quill sleeve rotatably supported by said case, drive means positioned at the outer end of said sleeve adapted for imparting rotation thereto, a drive gear within said case enclosure on the inner end of said sleeve and adapted to be driven thereby, a pinion shaft within said case, said shaft being rotatably supported at one end on bearing means within said sleeve, an intermediate shaft rotatably supported within said case, a driven gear on the intermediate shaft meshing with and driven by the drive gear on the quill sleeve, releasable clutch means on the pinion shaft to connect said shaft in direct driving relation with the quill sleeve, releasable clutch means on the intermediate shaft to connect said shaft in direct driving relation with the driven gear, coordinated operating means to operatively engage said pinion shaft and intermediate shaft clutch means alternately whereby only one of said shafts may be driven at a time directly by the drive means, gear means between the pinion shaft and the intermediate shaft whereby the driven one of said shafts may drive the other shaft, a power take-off shaft rotatably supported within said case, including releasable clutch means on the intermediate shaft and gear means for selectively driving the power take-off shaft from either the intermediate shaft, means including a releasable clutch means on the pinion shaft and gear means for driving the power take-off shaft from the pinion shaft through the second named gear means upon the third named releasable clutch means becoming disengaged, and means on said power take-off shaft for driving said drum.

65. In a device of the class described for driving a drawworks drum, the combination of a gear case, a quill sleeve rotatably supported by said case, drive means positioned at the outer end of said sleeve adapted for imparting rotation thereto, a drive gear within said case enclosure on the inner end of said sleeve and adapted to be driven thereby, a pinion shaft within said case, said shaft being rotatably supported at one end on bearing means within said sleeve, an intermediate shaft rotatably supported within said case, an intermediate gear on the intermediate shaft meshing with and driven by the drive gear on the quill sleeve, releasable clutch means on the pinion shaft to connect said shaft in direct driving relation with the quill sleeve, releasable clutch means on the intermediate shaft to connect said shaft in direct driving relation with the intermediate gear, coordinated operating means to operatively engage said pinion shaft and intermediate shaft clutch means alternately whereby only one of said shafts may be driven at a time directly by the drive means, gear means between the pinion shaft and the intermediate shaft whereby the driven one of said shafts may drive the other shaft, a power take-off shaft rotatably supported within said case, including releasable clutch means on the intermediate shaft and gear means for selectively driving the power take-off shaft from either the intermediate shaft, means including a releasable clutch means on the pinion shaft and gear means for driving the power take-off shaft from the pinion shaft through the second named gear means upon the third named releasable clutch means becoming disengaged, a driven gear rotatably mounted on the power take-off shaft adapted to be driven by said intermediate gear, clutch means to releasably connect said driven gear in direct driving relation with the power take-off shaft to drive the latter at another forward speed, and means on said power take-off shaft for driving said drum.

66. In a unitary type drawworks of the class described, the combination of a supporting frame, a drum shaft mounted on the frame, a drum supported on the shaft, a power take-off shaft, a driving connection including a releasable clutch on the drum shaft whereby the power take-off shaft may drive the drum, a power shaft, an intermediate shaft, a countershaft, means to rotatably support the power take-off, power, intermediate and countershafts on the frame, transmission means including a releasable clutch means for driving the intermediate shaft from the power shaft, transmission means whereby the intermediate shaft may drive the countershaft, and separate transmission means whereby the intermediate shaft may drive the power take-off shaft independently of the countershaft.

67. In a unitary type drawworks of the class described, the combination of a supporting frame, a drum shaft mounted on the frame, a drum supported on the shaft, a power take-off shaft, a driving connection including a releasable clutch on the drum shaft whereby the power take-off shaft may drive the drum, a power shaft, an intermediate shaft, a countershaft, means to rotatably support the power take-off, power, intermediate and countershafts on the frame, transmission means including a releasable clutch means for driving the intermediate shaft from the power shaft at a reduced speed relative to the power shaft, transmission means whereby the intermediate shaft may drive the countershaft, and separate transmission means whereby the intermediate shaft may drive the power take-off shaft independently of the countershaft.

68. In a unitary type drawworks of the class described, the combination of a supporting frame, a drum shaft mounted on the said frame, a drum supported on said shaft, a gear case mounted on said frame to the rear of the drum shaft, a power take-off shaft rotatably supported within the case, a driving connection including a releasable clutch on the drum shaft whereby the power take-off shaft may drive the drum, a power shaft rotatably supported in the case, drive means positioned exteriorly of the case at the outer end of the power shaft for imparting rotation thereto, an intermediate shaft and a countershaft rotatably supported within the case, the countershaft extending through one side of the case, a rotary drive means mounted on the countershaft extension and adapted to be driven by the shaft, transmission means including releasable clutch means within the case for driving the intermediate shaft from the power shaft, transmission means within the case for driving the countershaft from the intermediate shaft, and a separate transmission means within the case for driving the power take-off shaft from the intermediate shaft independently of the countershaft.

ALLEN ERWIN RICE.
JOHN SHELBY MORGAN, Jr.

CERTIFICATE OF CORRECTION.

Patent No. 2,026,141.                                                       December 31, 1935

ALLEN ERWIN RICE, ET AL.

It is hereby certified that the name of the assignee in the above numbered patent was erroneously described and specified as "The National Supply Company, of Toledo, Ohio, a corporation of Ohio" whereas said name should have been described and specified as The National Superior Company, of Toledo, Ohio, a corporation of Delaware, as assignee by mesne assignments of the entire interest in said invention, as shown by the records of assignments in this office; page 2, second column, line 62, for "gase" read gear; and that the said Letters Patent should be read with these corrections therein that the same may conform to the record of the case in the Patent Office.

Signed and sealed this 3rd day of March, A. D. 1936.

Leslie Frazer (Seal)                                         Acting Commissioner of Patents.